United States Patent
Cai et al.

(10) Patent No.: US 8,535,395 B2
(45) Date of Patent: Sep. 17, 2013

(54) BEAM WELDING OF A MULTI-SHEET WORK STACK HAVING A REDUCED THICKNESS FEATURE

(75) Inventors: Wayne W. Cai, Troy, MI (US); Thomas B. Stoughton, Birmingham, MI (US); David Yang, Pudong (CN); Xiang Zhao, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 13/069,639

(22) Filed: Mar. 23, 2011

(65) Prior Publication Data
US 2012/0241422 A1 Sep. 27, 2012

(51) Int. Cl.
| | |
|---|---|
| *B23K 26/20* | (2006.01) |
| *B23K 15/00* | (2006.01) |
| *H01M 4/00* | (2006.01) |
| *H01M 2/20* | (2006.01) |
| *H01M 2/30* | (2006.01) |

(52) U.S. Cl.
USPC ............ 29/623.1; 219/121.14; 219/121.64; 228/174

(58) Field of Classification Search
USPC ............ 219/121.63, 121.64, 121.85, 121.77, 219/121.13, 121.14; 228/174; 29/623.1
See application file for complete search history.

(56) References Cited

U.S. PATENT DOCUMENTS

| | | | | |
|---|---|---|---|---|
| 4,237,363 | A | * | 12/1980 | Lemelson ............... 219/121.85 |
| 5,211,327 | A | * | 5/1993 | Clarke et al. ................ 228/174 |
| 7,794,151 | B2 | * | 9/2010 | Neumann ................... 384/100 |
| 2001/0047983 | A1 | | 12/2001 | Degawa et al. |
| 2010/0147809 | A1 | | 6/2010 | Geisler et al. |
| 2010/0230390 | A1 | | 9/2010 | Nishio et al. |

FOREIGN PATENT DOCUMENTS

| | | |
|---|---|---|
| EP | 0527229 A1 | 2/1993 |
| JP | H04138888 A | 5/1992 |
| JP | H09108874 A | 4/1997 |
| JP | 2000090992 A | 3/2000 |

* cited by examiner

*Primary Examiner* — Samuel M Heinrich
(74) *Attorney, Agent, or Firm* — Quinn Law Group, PLLC

(57) ABSTRACT

A method for beam welding a multi-sheet work stack includes providing a reduced thickness feature in a first sheet, positioning the first sheet adjacent to a second sheet to define a first welding interface, and positioning a third sheet adjacent to the second sheet to define a second welding interface. A laser or electron beam is directed through the first sheet at the feature to form a fusion weld at one of the welding interfaces. A second beam may be directed onto the other interface to form a second fusion weld. Providing a reduced thickness feature in the first sheet may include forming the feature with the beam and mechanically pre-forming the feature. One of the interfaces may be pre-heated using the beam, and the beam may be split using a beam splitter to form multiple beams. A welded assembly formed via the method is also disclosed.

15 Claims, 2 Drawing Sheets

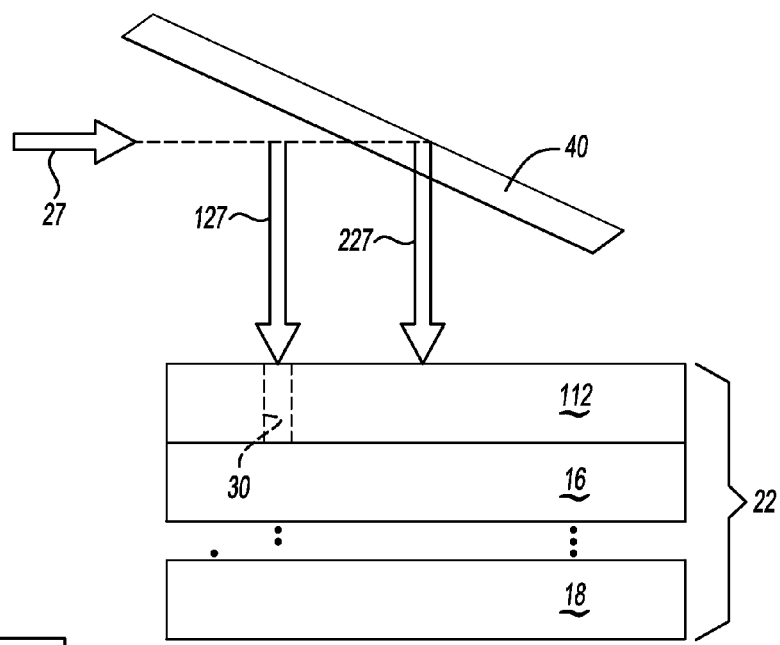
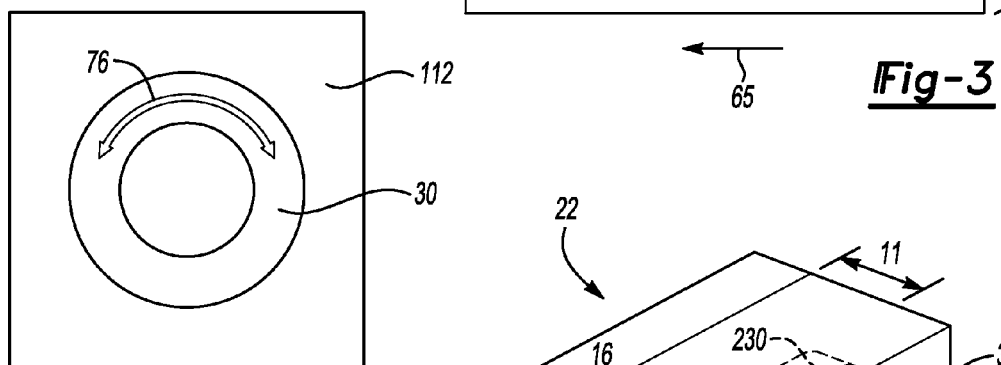
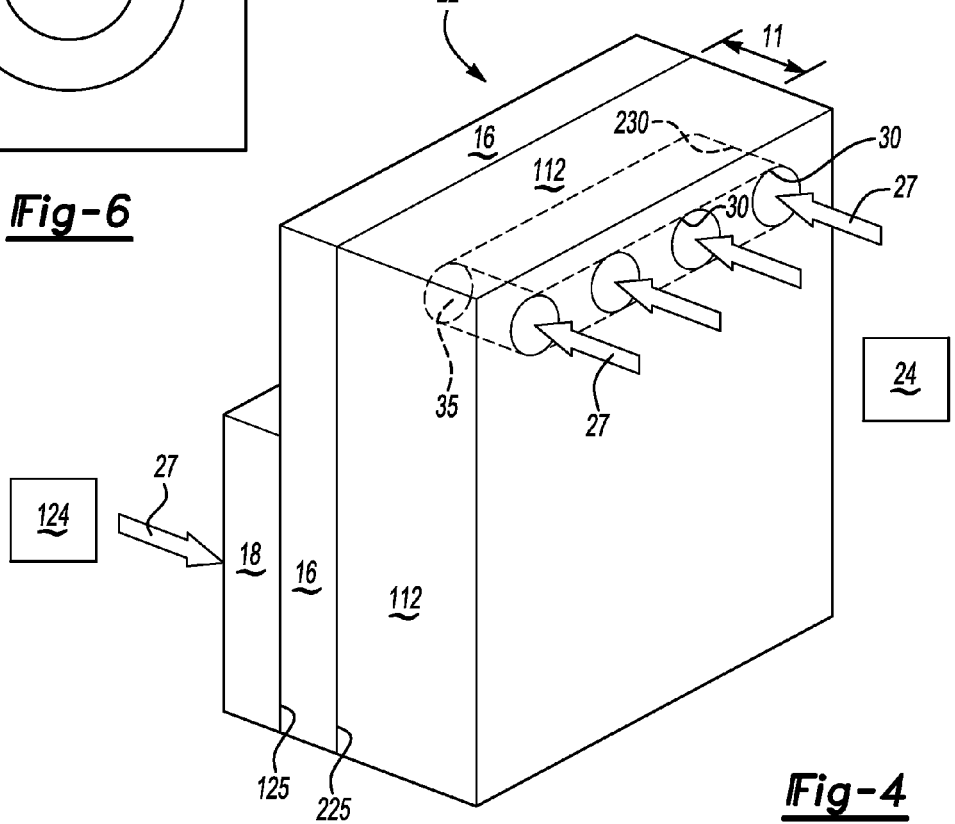

BEAM WELDING OF A MULTI-SHEET WORK STACK HAVING A REDUCED THICKNESS FEATURE

TECHNICAL FIELD

The present disclosure relates to optimized beam welding of a multi-sheet work stack, i.e., a work stack having three or more sheets.

BACKGROUND

Laser welding is a widely used commercial process in which a laser beam irradiates a targeted area of a work stack. Electron beams may be used in a similar manner. The irradiated material changes to a liquefied state due to the intensity of the laser beam. A fusion spot weld or weld seam results when the liquefied material cools. Beam welding can be used to effectively form a fusion weld completely through the thickness of a pair of adjacent sheets in a typical two-sheet work stack. However, suboptimal fusion welds may result when attempting to beam weld a work stack having three or more sheets, especially for dissimilar materials.

SUMMARY

A method is provided herein for beam welding a multi-sheet work stack, i.e., forming a fusion weld using a laser beam or an electron beam. One sheet has a reduced thickness feature, such as one or more holes, a trench, groove, slot, or another feature suitable for reducing the effective thickness of that particular sheet only in a specific area of the sheet. This area is adjacent to the locus of the fusion weld to be formed.

As used herein, the term "multi-sheet" refers to three or more stacked or adjacently-placed sheets, regardless of the relative thickness of the sheets. Beam welding of a two-piece work stack is most commonly performed by forming a lap joint through the entire thickness of the sheets. However, conventional lap joint welding techniques may be difficult to conduct effectively when the number of sheets in the work stack exceeds two, particularly when different materials are used in the construction of the sheets.

In one possible embodiment, the sheets may include a conductive interconnect member and battery tabs of a battery module.

A beam-welded assembly includes a first sheet having a reduced thickness feature, a second sheet positioned adjacent to a first sheet to form a first welding interface, and a third sheet positioned adjacent to the second sheet to form a second welding interface. A first fusion weld is present at the first welding interface, and a second fusion weld is present at the second welding interface.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of a multi-piece work stack being beam welded using a beam splitter so as to use a single beam source;

FIG. 4 is a schematic illustration of a multi-sheet work stack being beam welded using two steps and a set of reduced thickness features used to reduce the effective thickness of one of the sheets;

FIG. 6 is a schematic illustration of a sheet having an annular or ring-shaped reduced thickness feature.

DESCRIPTION

Figure 1:
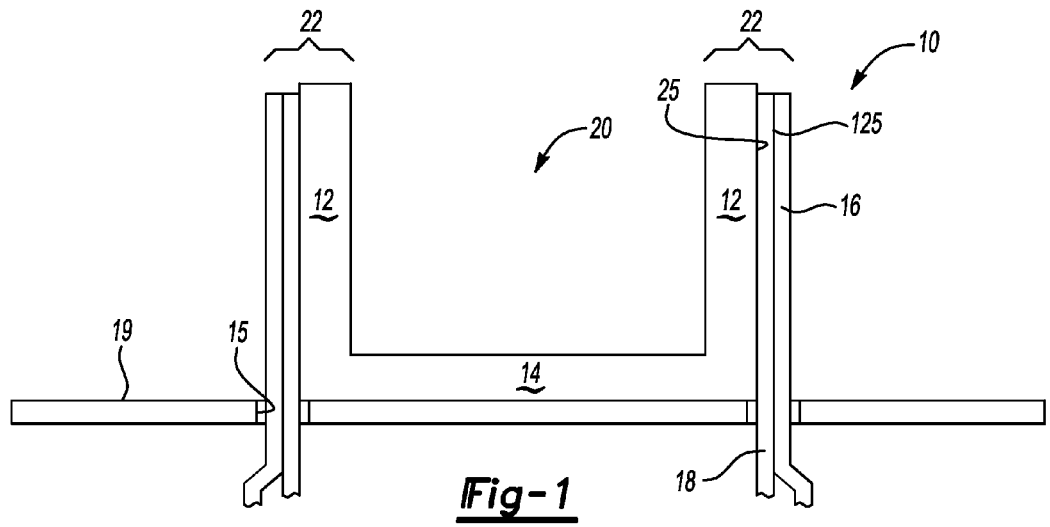
FIG. 1 is a schematic end view of an example welded assembly in the form of a battery module.

Referring to the Figures, wherein like reference numerals refer to like components, a welded assembly 10 is shown as a battery module of the type that may be used in automotive, industrial, household, or various other applications. Other multi-assemblies constructed using a multi-sheet work stack 22 may be formed via the methods set forth below, with the battery module example used solely for illustrative purposes, as will be understood by those of ordinary skill in the art. Regardless of the embodiment, at least one sheet of the assembly 10 has a reduced thickness feature that provides an optimal welding thickness in such a multi-sheet work stack 22.

The example battery module may be configured as a rechargeable lithium-ion polymer battery, although it is not limited to such a design. In one embodiment, the battery module may be configured to provide a voltage output sufficient for powering one or more traction motors (not shown) aboard a hybrid electric vehicle (HEV), an electric vehicle (EV), an extended-range electric vehicle (EREV), or the like, e.g., approximately 300 to 400 VDC or more depending on the application. Such levels are typical for electric-only (EV) propulsion modes.

The battery module embodiment may include one or more electrochemical battery cells (not shown) having thin sheets 16 and 18, e.g., electrode extensions or battery tabs. The sheets 16, 18 may be positioned adjacent to each other within a battery housing, with only the upper portion or interconnect board 19 of such a housing shown in FIG. 1 for simplicity. The interconnect board 19 may define apertures 15 through which the sheets 16 and 18 upwardly extend. The sheets 16 and 18 may be constructed of a different material than the interconnect member 20.

Any number of sheets, regardless of the nature of the welded assembly 10, may be "stacked" or otherwise positioned adjacent to each other. The sheets 16, 18 are then beam welded to a sheet 12, e.g., a portion of a conductive bus bar or interconnect member 20. The interconnect member 20 may be constructed of a conductive metal, e.g., copper or aluminum. In one possible embodiment, the interconnect member 20 may include a pair of the sheets 12 joined via another sheet 14, e.g., a floor. The sheets 16 and 18 and the sheet 12 form three different pieces or sheets of the work stack 22. For simplicity, a three-piece work stack 22 is described herein, however more than three sheets may be used to form the work stack 22.

Figure 2:
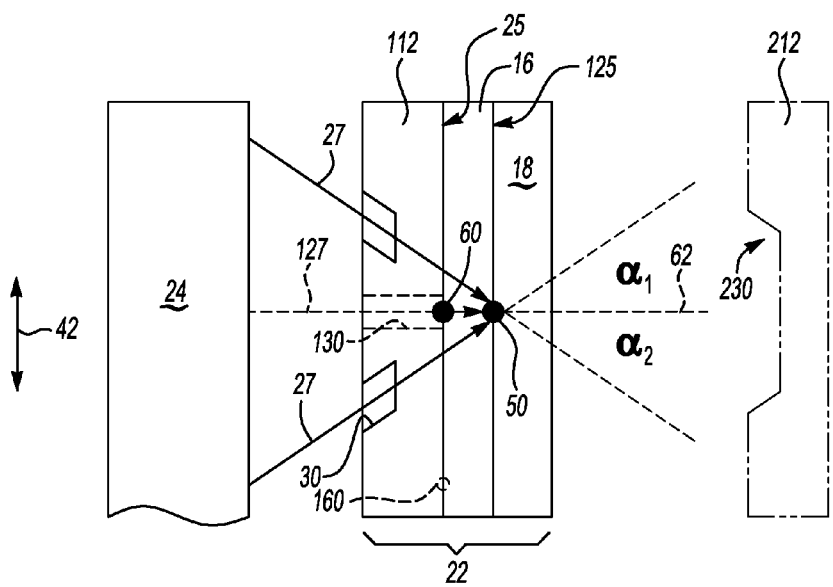
FIG. 2 is a schematic illustration of a multi-sheet work stack being beam welded through a reduced thickness feature defined by one sheet of the work stack.

Referring to FIG. 2, the work stack 22 may include a sheet 112 having a reduced thickness feature 30, 130, or 230, along with additional sheets 16 and 18. A beam source 24 directs energy beams 27 toward the work stack 22, e.g., as different energy beams or a rastered beam, and onto welding interfaces 25, 125. The reduced thickness feature 30, 130 may be one or more apertures or holes effectively reducing the amount of material of the sheet 112 through which the beams 27 must pass. Alternatively, as shown in phantom, a slot, trench, groove, or any other reduced thickness feature 230 may be provided in an alternately configured sheet 212. Combinations of the example features 30, 130, and 230 may also be used, and one of ordinary skill in the art will recognize that variants may exist for providing a functionally equivalent feature.

The reduced thickness features 30, 130, 230, however configured, allow the energy beams 27 to pass at least partially through the sheets 112, 212 to allow higher energy to fall incident upon a point 50 on the welding interface 125. According to one embodiment, the features 30 may be axially oriented at respective non-orthogonal angles ($\alpha 1$, $\alpha 2$) relative to the point 50 and a center axis 62. The actual orientation of the features 30, 130, or 230 may be selected such that the energy beams 27 are focused onto the point 50 near or on the welding interface 125.

After a weld is formed at point 50, with point 50 becoming the approximate center point of the weld, another energy beam 27 may be directed at point 60 at the welding interface 25 in a second step, or concurrently with the formation of the weld at point 50.

Referring briefly to FIG. 6, in an alternative embodiment the feature 30 of FIG. 2 may be annular, i.e., a single continuous ring-shaped feature on a surface facing the beam source 24. In such an embodiment the beam source 24 of FIG. 2 or the beam 27 it generates may be caused to rotate with respect to the plane of the sheet 112 such that a single energy beam 27 passes through the feature 30 as indicated by double arrow 76 in FIG. 5. Various control means may be selected for achieving such rotation, e.g., a turntable on which beam source 24 is positioned or other suitable means.

Referring again to FIG. 2, a fusion weld is thus formed between sheets 16 and 18, and between sheets 112 and 16. If an optional feature 130 is positioned between the features 30 as shown in phantom in FIG. 2, the beam source 24 and/or work stack 22 may be moved in either of the directions indicated by arrow 42. Doing so positions the axes of the energy beams 27 out of alignment with the features 30, 130 before forming the fusion weld at or along the welding interface 125, e.g., at point 160 shown in phantom.

Referring to FIG. 3, in another embodiment the reduced thickness features 30, 130, 230 shown in FIG. 2, and also in the embodiment of FIG. 4 described below, may be formed using a beam splitter 40. Sheet 18 here represents the $n^{th}$ sheet in the work stack 22, with $n \geq 3$. The energy beam 27 may fall incident upon the beam splitter 40 such that the energy beam 27 divides into multiple energy beams 127, 227, e.g., parallel or collimated beams as shown or other angles as desired.

The energy beams 127 may be controlled so as to preheat a targeted welding interface to enhance weld quality, and/or to drill or form a feature 30, 130, 230 (see FIG. 2) in the sheet 112. Such preheating can help minimize the heat sink effect of any structure surrounding the resultant fusion weld. The work stack 22 and/or the energy beams 27, 127, 227 may be moved or otherwise controlled, e.g., in the direction of arrow 65, so as to form a suitable fusion weld.

Referring to FIG. 4, a multi-sheet work stack 22 can be offset as shown. The work stack 22 includes sheets 16 and 18 positioned adjacent to sheet 112. Sheet 16 and sheet 18 are offset with respect to each other, and different beam sources 24, 124 are used to perform the beam welding operation. In this manner, a complex three-sheet stack up with a flush or even end, i.e., sheet 16, sheet 18, and sheet 112, is transformed into two two-layer stack ups, i.e., sheet 16 and sheet 18 as one layer having a welding interface 125, and sheet 16 and sheet 112 as another layer having a welding interface 225. In other words, a three-thickness lap joint is reduced to a two-thickness lap joint.

The sheet 112, and/or the sheet 18 when the sheet 18 is configured with one of the features 30 or its various embodiments as set forth herein, may include one or more of the reduced thickness features 30, 230 noted above with reference to FIG. 2. The exact configuration of the reduced thickness features 30, 230 may vary, provided that the reduced thickness features 30, 230 effectively reduce and optimize the thickness of the sheet 112. In this example, feature 130 of FIG. 2 is considered to be one and the same with feature 30, so for simplicity only feature 30 is described hereinafter. The features 30, 230 may be formed to a distance (arrows 11) from the sheet 16, with the thickness of sheet 112 being by careful selection of that distance. That is, the features 30, 230 define an inner surface 35 positioned toward the sheet 16, but still remaining a distance (arrows 11) away from the sheet 16. In other words, the features 30, 230 are not formed all the way through the thickness of sheet 112.

The reduced thickness features 30, 230, in any of the embodiments shown in the various Figures, may be preformed or drilled prior to beam welding. The beam sources 24 and 124 may be placed on opposite sides of the work stack 22. Each of the beam sources 24 and 124 may be independently or interdependently controlled to form a suitable fusion weld at the respective welding interfaces 125, 225. That is, the beam source 124 may form a fusion weld at or along the welding interface 125 between the sheets 18 and 16, while the beam source 24 simultaneously or separately forms another fusion weld at or along the welding interface 225 between sheet 112 and sheet 16.

The beam sources 24, 124 may be controlled using closed or open loop feedback control methods to ensure proper relative positioning or staggering of the welds. For instance, a feedback loop may exist between the beam sources 24, 124 to ensure proper coordination and placement of the fusion welds. In this manner, two different fusion welds may be formed between adjacent work pieces of the work stack 22.

Figure 5:
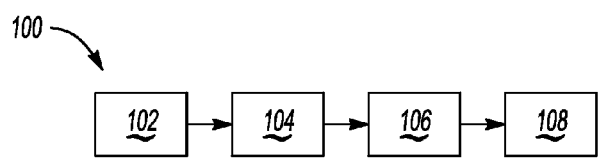
FIG. 5 is a flow chart describing a method for beam welding a multi-sheet work stack.

Referring to FIG. 5, a method 100 for welding the work stack 22 includes, at step 102, positioning a first sheet such as the sheet 16 adjacent to a second sheet, e.g., the sheet 18, to define a first welding interface 125 (see FIG. 4).

At step 104, a third sheet, e.g., sheet 112, is positioned adjacent to the second sheet to form a second welding interface 125, also shown in FIG. 4.

At step 106, the method 100 includes directing a first energy beam, e.g., the energy beam 27 of FIG. 4, through a reduced thickness feature 30, 230 as defined by the third sheet, e.g., sheet 112, for a duration sufficient for forming a fusion weld at the welding interface 225.

At step 108, a second energy beam 27 may be directed onto the other welding interface 125 to thereby form a second fusion weld. In this manner a welded assembly such as the battery module of FIG. 1, a multi-layer vehicle body panel, or any other beam welded assembly may be optimally formed relative to conventional lap joint methods.

While the best modes for carrying out the invention have been described in detail, those familiar with the art to which this invention relates will recognize various alternative designs and embodiments for practicing the invention within the scope of the appended claims.

The invention claimed is:
1. A method for beam welding a multi-sheet work stack, comprising:

positioning a first sheet having a reduced thickness feature adjacent to a second sheet to thereby define a first welding interface;

positioning a third sheet of the work stack adjacent to the second sheet to thereby define a second welding interface; and directing an energy beam through the reduced thickness feature of the first sheet to thereby form a first fusion weld at the first welding interface.

2. The method of claim 1, further comprising:

directing another energy beam through the third sheet to thereby form a second fusion weld at the second welding interface.

3. The method of claim 1, further comprising one of: forming the reduced thickness feature using the energy beam and mechanically pre-forming the reduced thickness feature.

4. The method of claim 1, further comprising:

pre-heating the first welding interfaces using the energy beam.

5. The method of claim 1, further comprising:

splitting the energy beam using a beam splitter to thereby form multiple energy beams.

6. The method of claim 1, wherein the reduced thickness feature includes one of a hole, a groove, a slot, and a trench defined by the first sheet.

7. The method of claim 1, further comprising:

positioning a first beam source adjacent to the third sheet;

positioning a second beam source adjacent to the first sheet; and independently controlling the first and second beam sources.

8. The method of claim 1, wherein the reduced surface feature is annular, the method further comprising:

generating the energy beam using a beam source; and rotating the beam source to thereby direct the energy beam in an annular pattern through the reduced surface feature.

9. A method for beam welding a battery module having a first battery tab, a second battery tab, and a conductive interconnect member, comprising:

positioning the interconnect member adjacent to the first battery tab to thereby define a first welding interface, wherein the interconnect member has a reduced thickness feature;

positioning the second battery tab adjacent to the first battery tab to thereby define a second welding interface; and directing an energy beam through the reduced thickness feature to thereby form a first fusion weld at the first welding interface, wherein the energy beam is one of a laser beam and an electron beam.

10. The method of claim 9, further comprising:

directing another energy beam through the second battery tab to thereby form a second fusion weld at the second welding interface.

11. The method of claim 9, further comprising one of: forming the reduced thickness feature using the energy beam and mechanically pre-forming the reduced thickness feature.

12. The method of claim 9, further comprising:

pre-heating the first welding interfaces using the energy beam.

13. The method of claim 9, further comprising:

splitting the energy beam using a beam splitter to thereby form multiple energy beams.

14. The method of claim 13, further comprising:

using one energy beam of the multiple beams to form the reduced thickness feature and to preheat the first welding interface, and using another energy beam of the multiple beams to form the first fusion weld.

15. The method of claim 9, further comprising:

positioning a first beam source adjacent to the second battery tab;

positioning a second beam source adjacent to the interconnect member; and independently controlling the first and second beam sources to form fusion welds at the first and the second welding interfaces.

* * * * *